United States Patent [19]

Martin

[11] 4,240,244
[45] Dec. 23, 1980

[54] FORAGE HARVESTER HAVING WATER INJECTION MEANS TO PREVENT GUMMING

[75] Inventor: Virgil B. Martin, West Bend, Wis.

[73] Assignee: Gehl Company, West Bend, Wis.

[21] Appl. No.: 75,144

[22] Filed: Sep. 12, 1979

[51] Int. Cl.³ .............................................. B02C 18/22
[52] U.S. Cl. ..................................... 56/16.4; 241/166;
56/16.8
[58] Field of Search ...................... 56/16.4, 16.8, 12.8, 56/13.3, 13.4, 13.9; 241/33, 38, 166; 172/606, 16.4, 16.6; 239/104, 106

[56] References Cited

U.S. PATENT DOCUMENTS

| | | | |
|---|---|---|---|
| 1,921,914 | 8/1933 | Edman | 241/166 |
| 3,977,605 | 8/1976 | Sheldon | 239/104 |
| 4,033,518 | 7/1977 | Fleming et al. | 56/13.9 |
| 4,068,223 | 1/1978 | Steffen | 56/10.2 |

*Primary Examiner*—Robert A. Hafer
*Attorney, Agent, or Firm*—James E. Nilles

[57] ABSTRACT

A mobile forage harvester for harvesting crop material, chopping the material and blowing the chopped material to a receptacle, the harvester having a water supply system for periodically injecting a controllable amount of water into the stream of crop material as it passes through said harvester to thereby minimize gumming up of said material in said harvester.

7 Claims, 6 Drawing Figures

FORAGE HARVESTER HAVING WATER INJECTION MEANS TO PREVENT GUMMING

BACKGROUND OF THE INVENTION

The present invention pertains to forage harvesters of the type adapted to move over the crop and harvest it, chop the crop material and then blow it into a receptacle such as a trailing wagon. In devices of this character certain problems arise due to the gumming up of the crop material along its path through the harvester, sometimes to such an extent that this gumming up retards or prohibits the free flow of material through the harvester. This gumming problem may occur in various portions of the harvester, such as in the portions which transfer the crop material from one of the elements or the other. This gumming often stops the free flow and it is desirable to be able to keep the various conveying areas of the harvester in a "slick" condition for maximum efficiency in moving the cut material through the harvester. This gumming up can thus occur in various parts of the harvester, depending on the type of material being conveyed and/or the condition, particularly the moisture content of it.

Such mobile harvesters are adapted to travel over the field for a considerable period of time in filling a trailing wagon for example, and the amount of water that can be carried by such a harvester is limited. Accordingly, it is necessary to efficiently use the water not only as to the location at which it is discharged into the stream of crop material, but also as to the amount of water discharged as well as being dependent on the amount of material flowing through the machine at any time.

SUMMARY OF THE PRESENT INVENTION

The present invention provides a mobile forage harvester for harvesting crop material from the ground over which it traverses and blowing chopped material to a receptacle, the harvester having a water supply system for periodically injecting a controllable amount of water into a stream of crop material as the latter passes through said harvester to thereby minimize gumming up of said material in said harvester.

A more specific aspect of the invention relates to such a harvester having crop material gathering means, chopping means, transferring means and blower means for successively handling the crop material. Furthermore, the water supply system includes a source of water carried by the harvester, a discharge means for discharging water into the stream of crop material, conduit means connected between and for conducting water from the water source to the discharge means, a water shut-off valve in the conduit means and shiftable between water flow and water shut-off positions, shiftable crop flow sensing means positionable in the path of the stream of crop material, and connecting means between the sensing means and the shut-off valve. The arrangement is such that the sensing means is operative by the flow of the stream of crop material to shift the shut-off valve to the water flow position to thereby cause water to be discharged into the stream of crop material, the sensing means also causing the shut-off means to shift to the water shut-off position when there is insufficient flow of the stream of crop material.

These and other objects and advantages of the present invention will appear hereinafter as this disclosure progresses, reference being had to the accompanying drawings.

DESCRIPTION OF A PREFERRED EMBODIMENT

Figure 2:
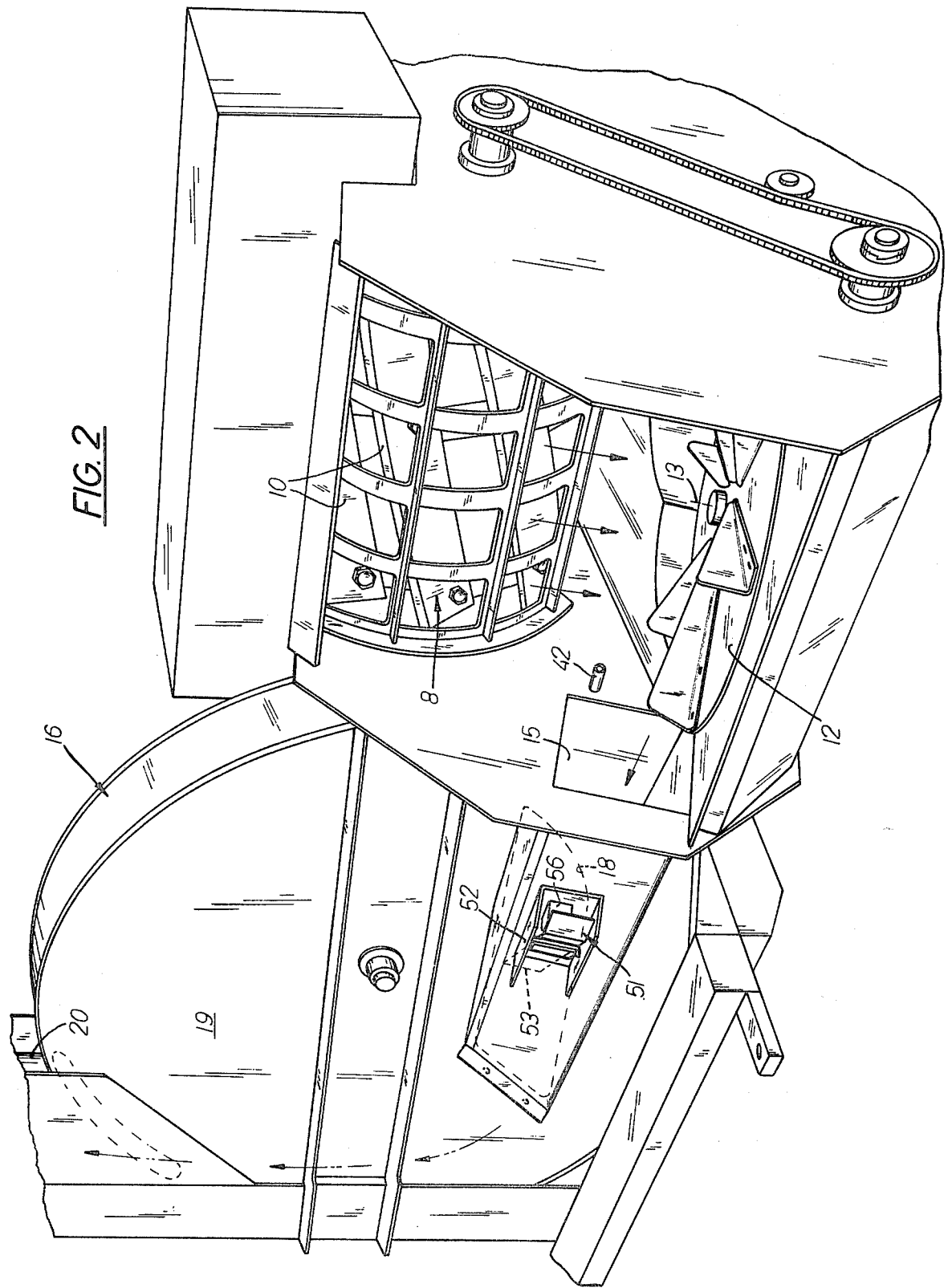
FIG. 2 is an enlarged, fragmentary, perspective view of a portion of the harvester shown in FIG. 1, the view being taken generally from the right rear side of the harvester, and certain parts being shown as broken away or removed for the sake of clarity in the drawings.

The general organization of the harvester shown for the purpose of illustrating the invention is disclosed in the U.S. Pat. No. 4,033,518 issued July 5, 1977 and entitled "Forage Harvester", said patent being owned by an assignee common with the present application. In that patent, a harvester head in the form of a row crop stalk gathering system is shown while in the present application there is disclosed a hay pick-up head 1 having ground engaging wheels 2. The head includes a conventional pick-up reel 3 which feeds the hay or other material rearwardly to oppositely wound and opposing auger flights 4 and 5. The auger flights are also conventional and feed the collected hay material rearwardly and into pairs of feed rolls 6, the feed rolls 6 being disposed generally one above the other and between which the crop material is then fed. The material is discharged from the rear side of the pair of feed rolls 6 and into the conventional cutting cylinder 8 which is rotatable about a generally horizontal axis and includes a series of circumferentially spaced and helically shaped blades 10 (FIG. 2). The cutting cylinder acts to chop the hay into short lengths which is then discharged rearwardly onto the rotatable spinner 12 which is mounted on a generally vertical axis 13.

Power is furnished to the above described elements to rotate them in the appropriate direction in timed sequence with one another in the well known manner and if further reference is deemed to be either necessary or desirable to such drive mechanism, reference may be had to the said U.S. Pat. No. 4,033,518.

The harvester also includes, as shown in the said '518 patent, transferring means in the form of a chute 15 and a vertically disposed generally cylindrical blower 16 in which is rotatably mounted the series of circumferentially spaced fan blades or paddles 17 that act to receive the crop material from the chute 15 and through an opening 18 (FIG. 2) in the generally vertical rear wall 19 of the blower. The material is swept from the discharge of the chute by the blower paddles 17 and discharged generally tangentially therefrom via the large conduit 20 which extends upwardly from the blower.

The material is discharged from the large conduit 20 and into a receptacle such as a trailing wagon (not shown) all as shown in U.S. Pat. No. '518.

The blower is also driven in a conventional manner by the power take-off shaft 21 extending rearwardly from the tractor or other propelling vehicle (not shown) through the gear box 22, sheave and pulley arrangement 23, and to the drive shaft 25 to which the paddles 17 are rigidly secured. The power to the chopping cylinder 8 is provided by the power shaft 27 which is also driven from the gear box 22. Power to the feed rolls is provided via conventional chain and sprocket means 29, power shaft 30, gear box 31, chain and sprocket means 32 which are also connected to the power shaft 27. The auger means 4 and 5 and the finger type pick-up 3 are also suitably and rotatably driven by conventional power means (not shown).

By way of a brief summary, the mobile forage harvester travels over the ground and has crop material gathering means which feed the material to the chopping means 8 and then to the rotatable spinner 12 which together with the chute 15 acts as transferring means and feeds the chopped material to the blower 16 from whence it is discharged to the conduit 20. As the stream of crop material flows through the harvester, there is a tendency for a deposit of material to occur at various locations which is commonly referred to as gumming up. This gumming up may occur to such an extent that the free flow of material through the harvester is prohibited and renders the machine inefficient sometimes to the point where malfunction of the parts will occur. In accordance with the present invention, a water injection system is provided for the harvester and by means of which a controlled and adjustable supply of water is introduced into the flow path of the stream of crop material as required. As will presently appear, sensing means are provided in the flow path of the material to regulate the timing of the injection of water into the crop material depending on the volume of crop material flowing through the machine.

Figure 1:
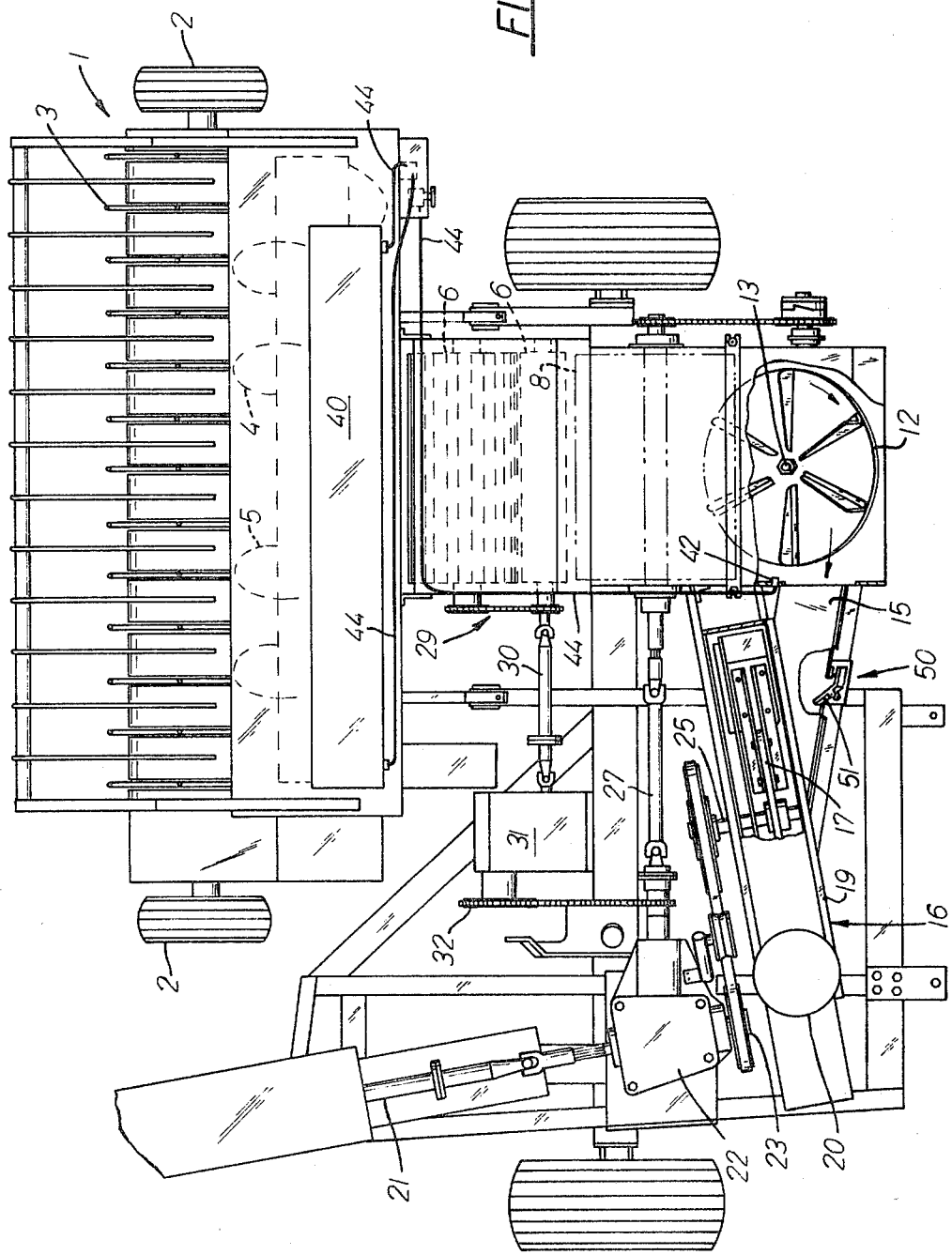
FIG. 1 is a plan view of a forage harvester embodying the present invention, certain parts being shown as broken away or removed for the sake of clarity in the drawings.
Figure 3:
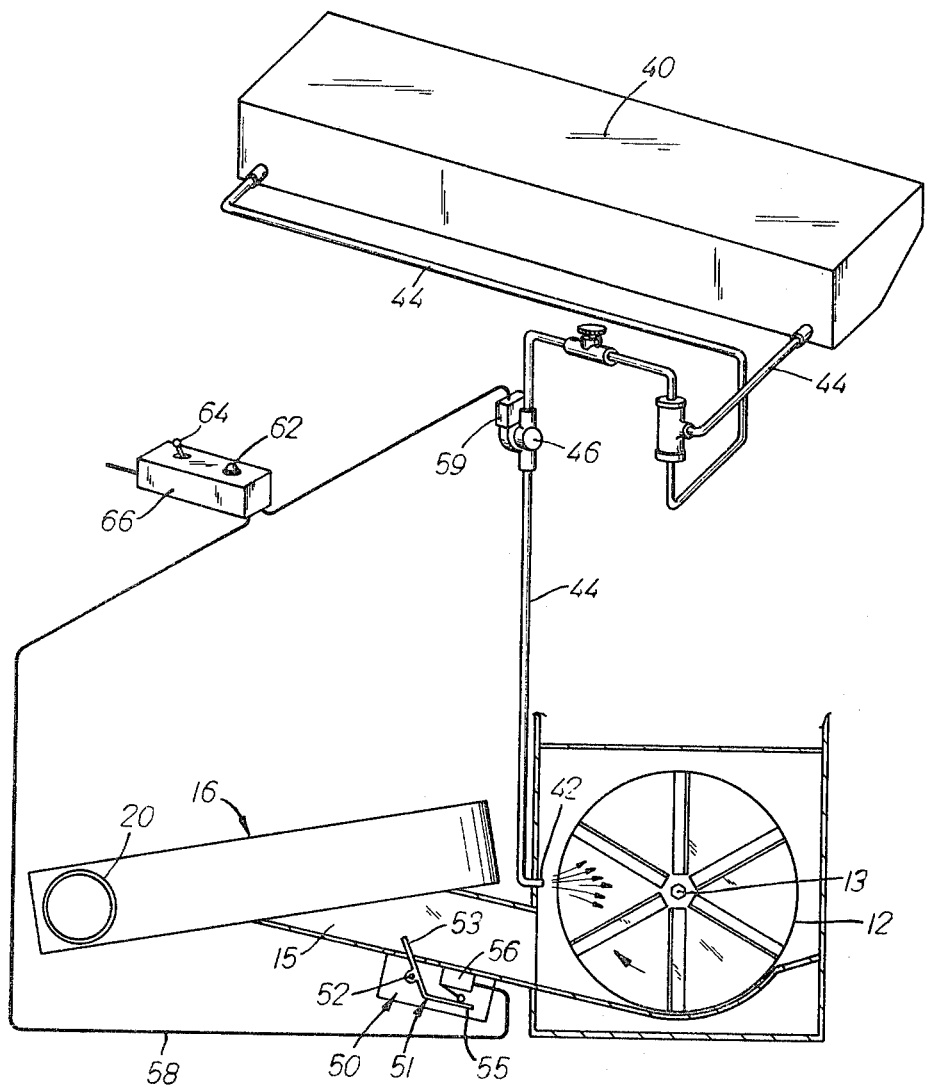
FIG. 3 is a schematic view of certain portions of the harvester including the water injection system provided by the present invention.

The water supply system includes a storage tank 40 shown as being located above and mounted on the hay head 1, the tank having a capacity of about 40 gallons and thus constitutes a source of water. A water discharge means 42 is shown in FIGS. 1, 2 and 3 and is located to discharge water above the rotatable spinner 12. Conduit means 44 is connected between the tank 40 and the discharge means 42 and acts to conduct water from the tank to the discharge means. It should be understood that the discharge means 42 could be located elsewhere, or in addition to its shown location, for example, so that the discharge is into the blower itself or in the chute 15.

A water shut-off valve 46 is located in the conduit and is preferably of the electrical solenoid operated type. This shut-off valve is shiftable between water flow and water shut-off positions. The system also includes shiftable crop flow sensing means 50 shown as being located in the chute 15. This sensing means includes a plate 51 that is pivotally mounted at 52 and which has an outwardly extending portion 53 that extends through the flow path of the crop material as the latter passes through the chute 15. The opposite end 55 of the plate 51 serves to engage and actuate a micro-switch 56 when the flow of crop material is sufficient in the chute to cause the plate 51 to pivot in the direction shown by the curvilinear arrows shown in FIG. 5. Sufficient movement of the plate 51 in that direction serves to actuate the micro-switch which through the electrical line 58 in turn actuates the solenoid 59 of the water shut-off valve to thereby cause the valve to move to the water flow position. In this manner, when there is sufficient flow of crop material flowing through the chute, the water valve is opened to permit water to be injected into the flow path of the material.

Figure 6:
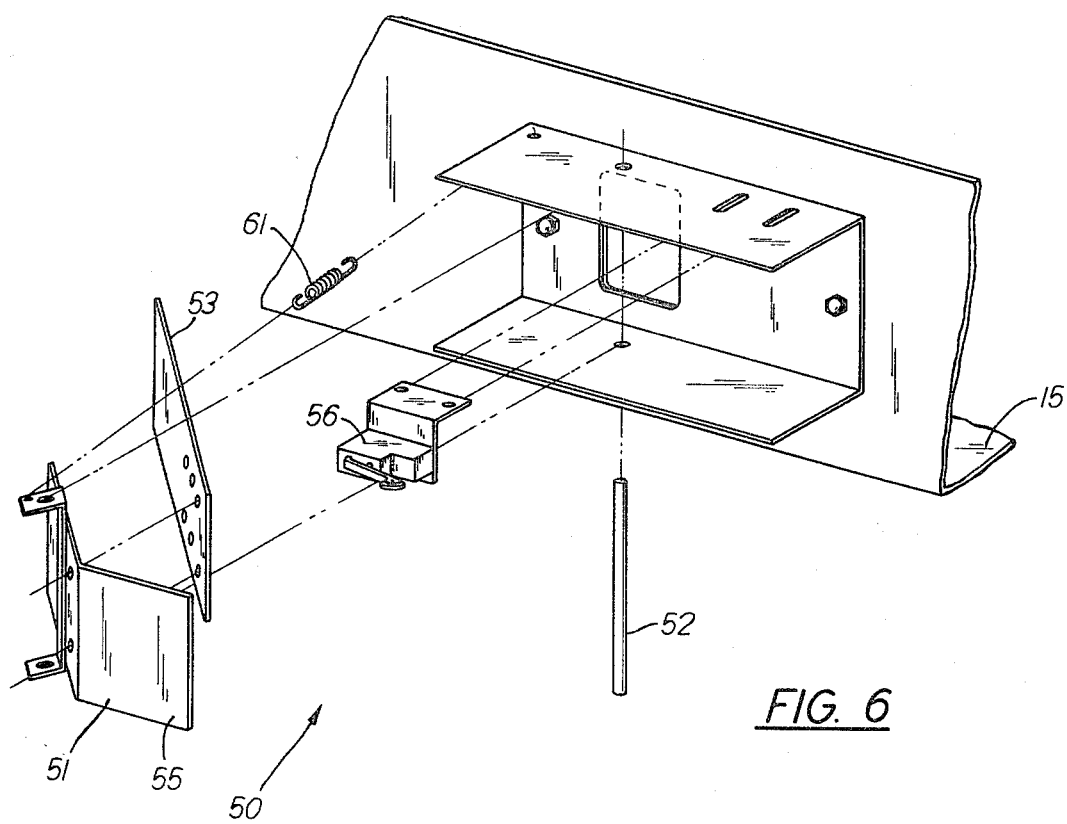
FIG. 6 is a perspective, exploded, fragmentary view of the crop sensing means shown in the other figures.

A spring 61 (FIGS. 5 and 6) connected between the machine frame and the plate 51 serves to resiliently load and return the plate to the water valve off position, that is away from the micro-switch 56. Thus, the valve 46 will be closed and thus water will not be wasted or inefficiently used, when no crop material is flowing.

Figure 4:
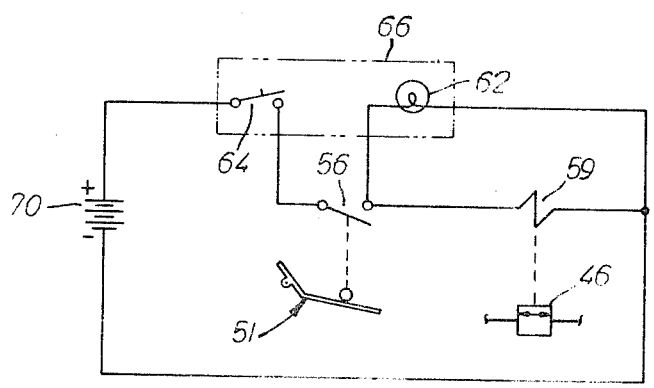
FIG. 4 is a schematic electrical diagram of a portion of the water injection system provided by the present invention.
Figure 5:
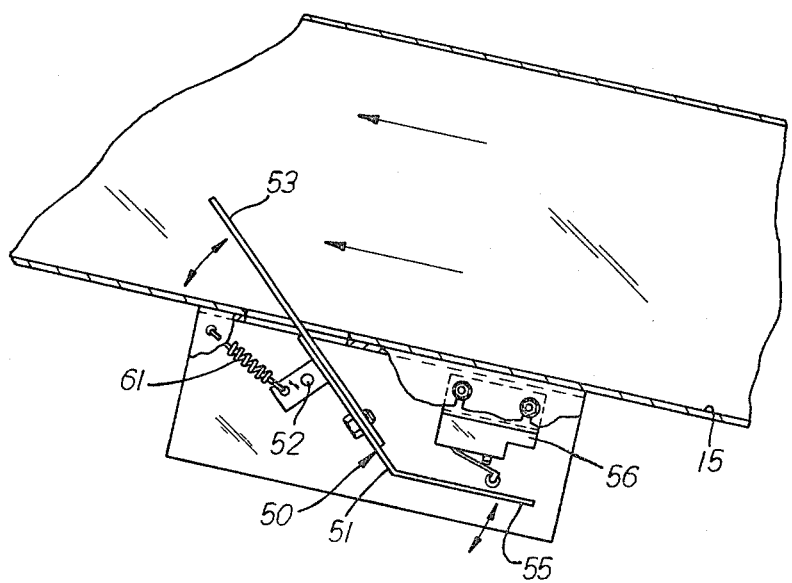
FIG. 5 is an enlarged, fragmentary, plan view in section of a portion of the chute between the impeller and blower which are shown in the other drawings.

The electrical circuit shown in FIGS. 4 and 5 includes a visual lamp 62 which is turned on when the micro-switch is closed, that is when the valve 46 is open and water is flowing. An electric on-off switch 64 is also provided in the control box 66 along with the lamp 62, and the control box 66 can be conveniently located for ready inspection and observation by the vehicle operator. The circuit shown in FIG. 4 also includes the battery 70 located on the tractor.

The water supply system provided by the present invention insures maximum and efficient use of water, such use occurring only when required by the flow of crop material through the machine. The water injected into the stream of crop material acts to lubricate the machine parts and otherwise prevent gumming up of crop material on those parts. As a result, the parts of the machine and the flow path of the crop material remain in a slick condition and result in reduced overall energy due to the elimination of the gumming conditions.

I claim:

1. A mobile forage harvester having means for harvesting crop material from the ground, means for chopping and blowing chopped material, and a water supply system for periodically injecting a controllable amount of water into a stream of chopped crop material as the latter passes through said harvester to thereby minimize gumming up of said material in said harvester, said system including, a source of water carried by said harvester, a discharge means for discharging water into said stream of crop material, conduit means connected between and for conducting water from said source to said discharge means, a water shut-off valve in said conduit means and shiftable between water flow and water shut-off positions, shiftable crop flow sensing means positionable in the path of said stream of crop material and connected with said valve, said sensing means being operative by the flow of said stream of crop material to shift said shut-off valve to said water flow position to thereby cause water to be discharged into said stream of crop material.

2. The harvester set forth in claim 1 further characterized in that said sensing means includes a shiftable member at least partially extending into the flow path of said crop material and switch means contactable by said shiftable member, and said water shut-off valve includes an electrical solenoid, and said connecting means is an electrical connection between said switch means and said solenoid, whereby when said switch means is actuated by said shiftable member, said solenoid is actuated to shift said shut-off valve to said water flow position.

3. In a mobile forage harvester for harvesting crop material from the ground over which it traverses and blowing chopped material to a receptacle, said harvester having crop material gathering means, chopping means, transferring means and blower means for successively handling the crop material, a water supply system for periodically injecting a controllable amount of water into a stream of crop material as the latter passes through said harvester to thereby minimize gumming up of said material in said harvester, said system including, a source of water carried by said harvester, a discharge means for discharging water into said stream of crop material, conduit means connected between and for conducting water from said source to said discharge means, a water shut-off valve in said conduit means and shiftable between water flow and water shut-off positions, shiftable crop flow sensing means positionable in the path of said stream of crop material, and connecting means between said sensing means and said shut-off valve, said sensing means being operative by the flow of said stream of crop material to shift said shut-off valve to said water flow position to thereby cause water to be discharged into said stream of crop material.

4. The harvester set forth in claim 3 further characterized in that said sensing means includes a shiftable member at least partially extending into the flow path of said crop material and switch means contactable by said shiftable member, and said water shut-off valve includes an electrical solenoid, and said connecting means is an electrical connection between said switch means and said solenoid, whereby when said switch means is actuated by said shiftable member, said solenoid is actuated to shift said shut-off valve to said water flow position.

5. The harvester set forth in claim 4 further characterized in that said sensing means is located adjacent said transferring means and located up-stream from said blower means in respect to the direction of flow of crop material.

6. The harvester set forth in claim 3 further characterized in that said transferring means includes a rotatable spinner located rearwardly of said chopping means to receive chopped material therefrom, and also includes a chute between said spinner and said blower means, and said sensing means is located adjacent said chute.

7. The harvester as described in claim 6 further characterized in that said sensing means includes a pivoted member having one end extending into said chute, and also includes an electrical switch contactable by another end of said pivoted member, and said shut-off valve includes an electrical solenoid connected to said electrical switch by said connecting means.

* * * * *